A. LANGERFELD.
SEPARATOR FOR LUMP MATERIAL.
APPLICATION FILED MAR. 15, 1902.

977,956.

Patented Dec. 6, 1910.
5 SHEETS—SHEET 1.

Fig. 1

Inventor
Arthur Langerfeld

A. LANGERFELD.
SEPARATOR FOR LUMP MATERIAL.
APPLICATION FILED MAR. 15, 1902.

977,956.

Patented Dec. 6, 1910.
5 SHEETS—SHEET 2.

A. LANGERFELD.
SEPARATOR FOR LUMP MATERIAL.
APPLICATION FILED MAR. 15, 1902.

977,956.

Patented Dec. 6, 1910.
5 SHEETS—SHEET 3.

Witnesses

Inventor
Arthur Langerfeld

THE NORRIS PETERS CO., WASHINGTON, D. C.

A. LANGERFELD.
SEPARATOR FOR LUMP MATERIAL.
APPLICATION FILED MAR. 15, 1902.

977,956.

Patented Dec. 6, 1910.
5 SHEETS—SHEET 4.

Witnesses

Inventor
Arthur Langerfeld

A. LANGERFELD.
SEPARATOR FOR LUMP MATERIAL.
APPLICATION FILED MAR. 15, 1902.

977,956.

Patented Dec. 6, 1910.
5 SHEETS—SHEET 5.

Witnesses
Bernard W. Boutz
Francis L. Maguire

Inventor
Arthur Langerfeld
By Robert Watson
Attorney

UNITED STATES PATENT OFFICE.

ARTHUR LANGERFELD, OF SCRANTON, PENNSYLVANIA.

SEPARATOR FOR LUMP MATERIAL.

977,956.   Specification of Letters Patent.   Patented Dec. 6, 1910.

Application filed March 15, 1902. Serial No. 98,381.

*To all whom it may concern:*

Be it known that I, ARTHUR LANGERFELD, a citizen of the United States, residing at Scranton, in the county of Lackawanna and State of Pennsylvania, have invented certain new and useful Improvements in Separators for Lump Material; and I do hereby declare the following to be a full, clear, and exact description of the invention, such as will enable others skilled in the art to which it appertains to make and use the same.

My invention relates to improvements in separating machines of the character shown in my Patent No. 719,343, by which lump material consisting of a mass or mixture of pieces differing in their specific gravities and in the frictional nature of their surfaces are separated or assorted, so that the pieces which are alike, or most nearly alike, in the above qualities are picked out and collected together separately from the other pieces; and the objects of my invention and improvements are:—first, to bring about a more positive assortation and a wider separation than has heretofore been attained; second, to increase the range of qualities, sizes, and shapes of the pieces separable in one machine; third, to increase the capacity of machines of this kind; fourth, to reduce the room occupied by such machines; fifth, to reduce the cost; and sixth, to lessen the loss caused by chipping or breaking of the pieces in passing through the separator.

My present improvements are especially applicable to coal separators and for repicking what was formerly thrown away as not worth picking, and now known as culm, and contained in the culm dumps or slate banks at the mines.

I attain these objects by the means and mechanism illustrated in the accompanying drawings in which:—

In the various figures of the drawing W indicates a frame or housing which incloses and supports the separator mechanism.

Figure 1:
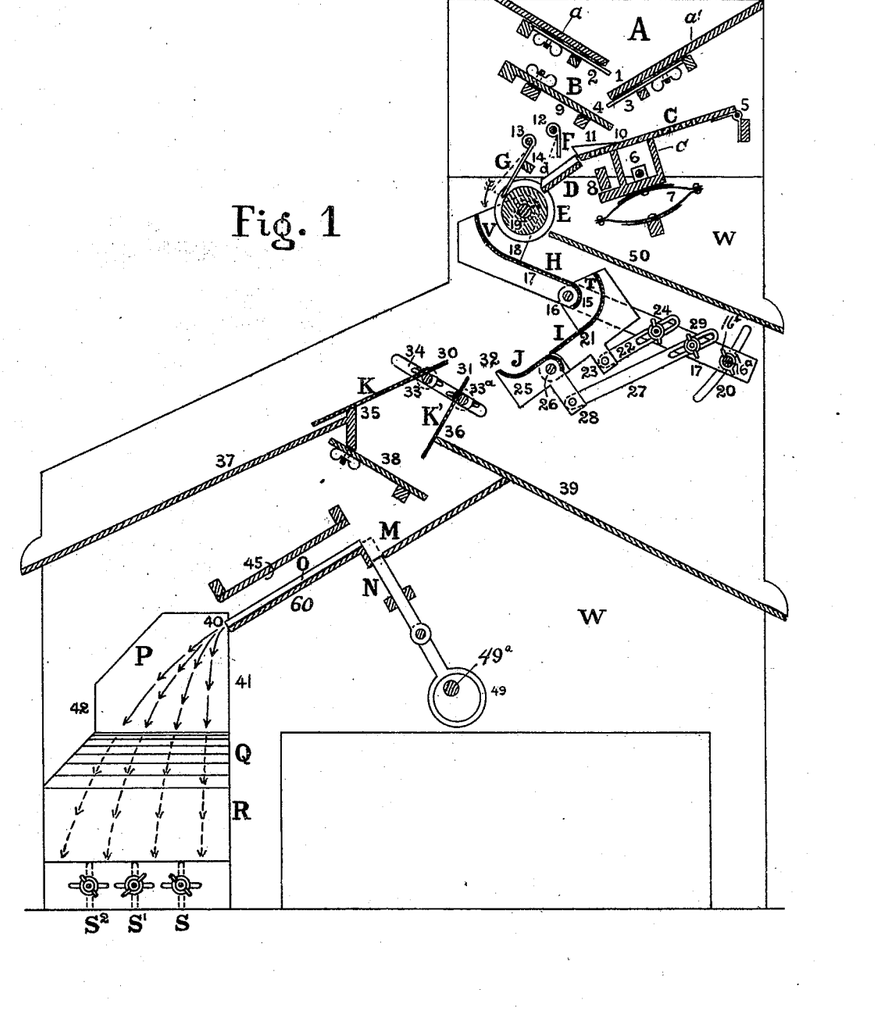
Figure 1 is a central vertical section of an entire separator.
Figures 2, 3, 4, 5, 6, 7, 8:
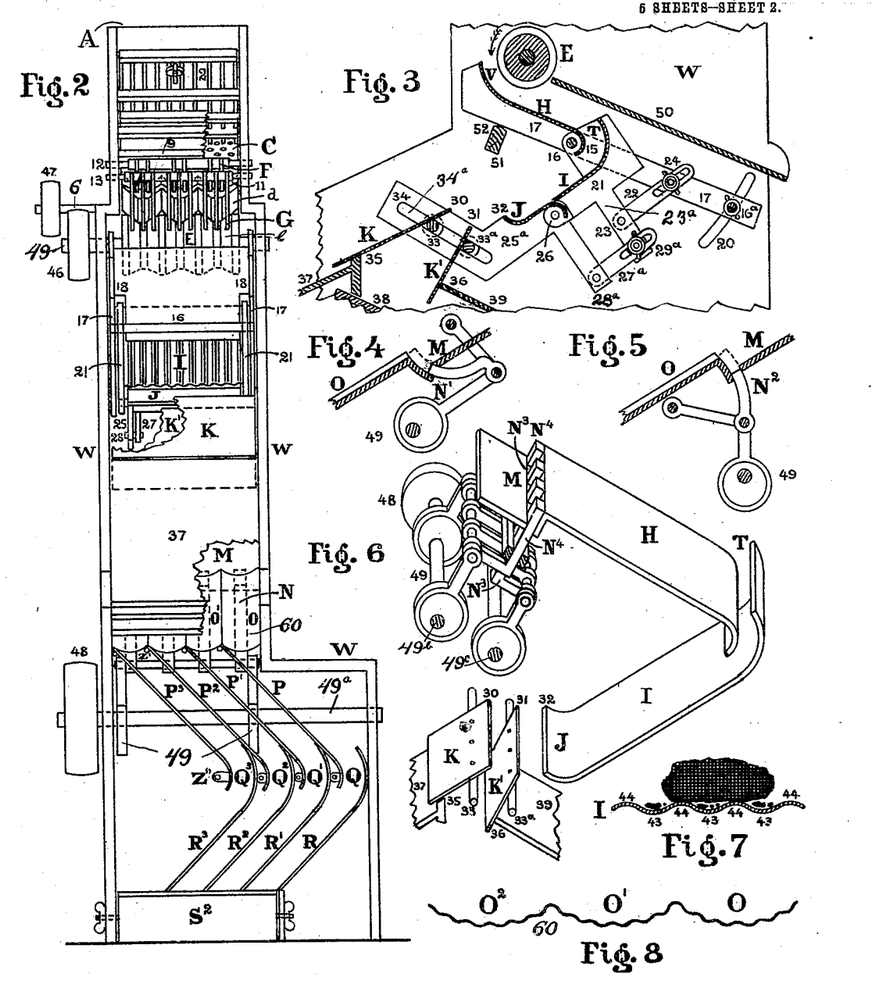
Fig. 2 is a front elevation of the same.
Fig. 3 is a central section of the upper slides showing modified details for adjusting.
Figs. 4 and 5 are side views of modified forms of feeding mechanism, the adjacent parts of the receiving pocket and slide being shown in vertical section.
Fig. 6 is a perspective view of another arrangement of the feeding mechanism, showing also reversely inclined slides and separating partitions.
Fig. 7 is a cross section, on an enlarged scale, through a portion of one of the upper slides shown in Figs. 1 and 2.
Fig. 8 is a similar sectional view taken through the chute leading from the lower feeding mechanism.

Referring to Figs. 1 and 2 of the drawing, A indicates a receiving and storing pocket or hopper, arranged in the upper part of the frame W, and into which the material to be separated is fed or dumped. The bottom pieces $a$ and $a'$ of this pocket, as shown, are inclined, and an outlet opening 1 is provided between said pieces. A gate 2 is adjustably secured to the piece $a$, its function being to vary the width of the opening. The lower end of the bottom piece $a'$ extends below the opening and directs the material from the hopper or pocket A into a secondary pocket B formed by said extended end and an adjustable plate 9 which is inclined in an opposite direction to the piece $a'$ of the hopper A and extends past the lower end of said piece, leaving an outlet opening 4 therebetween. The plate 9 forms the bottom of the secondary pocket B. The width of the outlet opening 4 may be varied by means of a gate or valve 3 adjustably secured to the piece $a'$. By properly restricting the width of the openings 1 and 4, the material will feed by gravity through the pockets in a thin stream onto a moderately inclined feed plate C, sloping in an opposite direction to the plate 9 and extending beneath the end of said plate, leaving an outlet opening 10 therebetween. The arrangement is such that any accumulation of material in the pocket B will exert a back pressure upon the material coming from the pocket A and thus the flow of material will be regulated. The width of the opening 10 may be varied by moving the adjustable plate 9.

Figure 23:
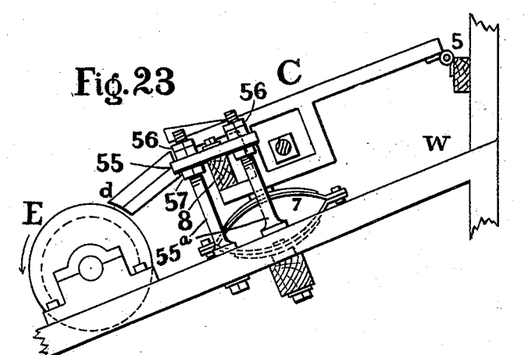
Fig. 23 is a side elevation showing the feed roller, feed plate, and a vertically adjustable stop or striker for the feed plate.

The feed plate C, which is preferably perforated, as shown, to permit the dust and fine material to fall through, is connected at its upper end to a fixed part of the separator frame-work by a hinge joint 5, and its lower end is supported by a spring 7. The feed plate is inclined, as shown, at such an angle that the material delivered onto it would not freely slide down by gravity alone, if the plate were stationary. The feed plate is constantly vibrated by means of an angular shaft 6 which bears against the bottom of a stirrup $c$ attached to the feed plate and resting upon the spring 7. The shaft is rotated by means of a driving pulley 47, and the plate is forced downward thereby against the action of the spring several times during each revolution of the shaft, and returned by the spring. A stop 8 is arranged to limit the upward movement of the plate. This stop, as shown in Fig. 23, is supported by cross-pieces 55 which are adjustably secured upon standards $55^a$ by means of nuts 56 and 57. By adjusting the stop vertically the amount of movement given to the plate may be regulated. The arrangement is such as to give a jarring movement to the plate.

The upper portion of the feed plate, has a plain flat surface, and upon the lower portion are arranged what I term parters or stream breakers 11, consisting of ribs lying longitudinally of the feed plate, pointed at their upper ends, and increasing in height and width toward their lower ends. The sides of the ribs are inclined, thus forming downwardly converging channels with sloping sides between the adjacent pairs of ribs, as shown in Figs. 1, 19, 23, 24 and 27. The jarring movement imparted to the plate causes the material received upon its upper portion to spread out thereon and move downward in a thin stream to the parters or stream breakers 11, between which the material is divided into a number of narrow streams. This jarring movement causes the flat and naturally slow moving pieces to travel down substantially as fast as the other pieces on the plate.

Figure 24:
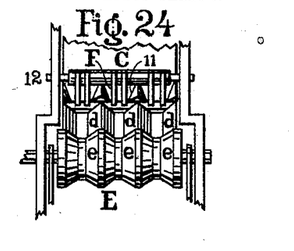
Fig. 24 is a front view of the feed roller, shown in Figs. 1 and 2, showing also the sectional apron and feed chute, the drags in front of the roller and the slide being omitted.
Figure 25:
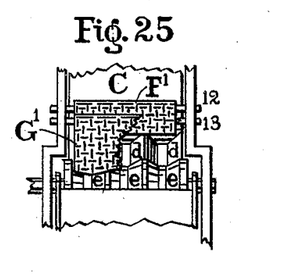
Fig. 25 is a similar view, showing the drag in front of the roller, partly broken away, and the upper end of the slide.
Figure 27:
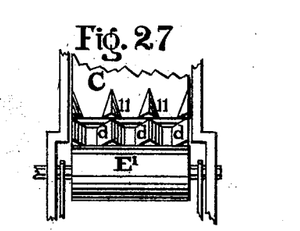
Fig. 27 is a front elevation of a feed roller having a plain surface, and the chute and part of the feed plate leading to said roller.

The material passes from the channels on the feed plate into channels $d, d$ upon a feed chute or slide D. These channels $d$, as shown in Figs. 24, 25 and 27, have sloping sides, and they are made wide enough only to receive single pieces of material. The channels $d$ are arranged in line with similarly formed annular channels $e$ upon a feed roller E, and conduct the material in single-piece files to the feed roller. A sectional apron or strick consisting of strips of metal F, loosely suspended from a rod 12 above the chute D, retards pieces of material which roll or bound from the end of the feed plate and causes them to pass into the channels $d$, through which they pass to the feed roller in the same manner as the sliding pieces.

The roller E is constantly driven in the direction of the arrow, Fig. 1, by means of a pulley 46, and the material delivered into the channels on the upper side of the roller, in single-piece files, spaced laterally apart, is carried forward and falls from the forward side of the roller on to a curved receiving and deflecting plate V at the upper end of a differentiating slide section H. In order to drop the pieces of material from the single-piece files one by one, and at equal intervals apart, as nearly as may be, drags G, consisting, as shown in Figs. 1 and 2, of strips of metal loosely suspended from a rod 13 above the roller, are arranged to bear against the material and hold each piece in succession in its place until it passes from beneath the drag, and slides down the face of the roller onto the curved receiving plate. In order to prevent the drags from wearing upon the roller when the machinery is running without any material passing through, a stop or rest 14 is arranged to hold the drags out of actual contact with the roller.

The fine material which falls through the perforations in the feed plate and between the chute D and feed roller is conducted away by a chute 50 arranged to catch it.

The slide section H, onto the upper end or curved deflecting portion V of which the pieces of material are fed, spaced individually apart from one another, in the manner described, is carried by a slide-supporting frame 17. The upper end of this frame, as shown in Fig. 1, is suspended by arms 18 from the shaft 19 of the roller. The deflecting part V is substantially concentric with the roller, and the frame 17 is adjustable concentrically about the roller shaft. The lower end of the frame 17 is adjustably secured to the separator frame W by means of a rod $16^a$ passing through the frame 17 and into slots 20 in the separator frame, and suitable clamping means, such as the wing nuts $16^b$ upon said rod which clamp the sides of the frame 17 against the separator frame. The slot 20 is concentric with the feed roller shaft.

The lower or discharge end 15 of the slide section H is turned downwardly substantially concentric with a horizontal shaft 16 secured to the slide frame 17. Upon this rod 16 is journaled a slide frame 21, carrying a lower or secondary slide section, I, sloping in a reverse direction to the upper section H, and having at its upper end a part T curving around and above the lower curved end of the section H. The slide frame 21 is adjustably secured to the slide frame 17 by means of a rod 22, hinged to the former as indicated by the numeral 23, and adjustably connected to the latter, as indicated by the numeral 24. By this means the slide section I can be adjusted relatively to the slide section H, and both sections can be adjusted relatively to the roller to vary the inclinations of the slides, both being movable substantially concentric with the roller.

The upper end T of the slide section I and the lower end 15 of the slide section H are so formed and arranged that the pieces of material leaving the upper slide section will be inverted in passing onto the lower section in the same manner as is shown and described in my Patent No. 719,343 hereinbefore referred to, so that the pieces will be subjected to the frictional resistance of their opposite sides in passing over the two slide sections. The curved end T intercepts the faster and slower moving pieces leaving the upper section at substantially equal angles and directs their courses around onto the lower section without materially changing their relative velocities acquired on the upper section. Composite pieces having coal on one side and slate on the opposite side are thus given a speed at the end of the slide intermediate that of pure coal or pure slate. As all the pieces are spaced apart on the slide, and collisions between the pieces are largely averted, each piece will acquire a velocity peculiar to its own properties.

The material, in passing from the slide, passes over a projector J at the lower end of the slide and is projected from the end 32 of the projector toward separating plates K, K′, the upper ends 30 and 31 of which divide the stream of flying pieces into three parts, the pure coal, which moves the fastest, passing over the partition K, the slate and refuse, which moves slowest, passing between the projector and the plate or partition K′, and the material of medium or mixed quality passing between the separating plates. The best material is conducted away by a chute 37, the slate and refuse, by a chute 39, and the mixed material is conducted to a secondary separator for further separation. The material is thus given a primary separation, in which the best and poorest material is removed, leaving only the material of intermediate quality to be separated.

The protector shown in Fig. 1 is connected to the slide in such manner that the projector may be adjusted independently of the slide, or the projector will adjust itself automatically to suit the inclination of the slide when the latter is adjusted. As shown, the projector consists of a reversely curved plate, carried by a frame 25 which is journaled upon a rod 26 secured to the slide frame 21. The upper portion of the projector is convexly curved around the rod 26 substantially concentric with said rod, and fits against and extends beneath the end of the slide plate or section I, making a hinge joint which does not interrupt the practical continuity of the slide section and projector when arranged at different angles. The lower end of the projector is concave, so as to project the material upwardly relatively to its course upon the slide.

The projector frame 25 has an arm 28 to which is pivotally connected a slotted adjusting rod 27, which latter is adjustably connected by a clamp 29 to the upper slide frame 17. By properly proportioning the length of the arm 28 and arranging the clamp 29 so that the rod 27 may swivel thereon, the projector will adjust itself when the slide section I is adjusted by the rod 22.

The separating plates K, K′ in Fig. 1 have their upper end portions attached to rods 33, $33^a$ which project laterally beyond the plates and are adjustably held within slots 34 in the sides of the frame W. The lower portions of the plates rest upon fixed stops 35 and 36, which, as shown, are at the upper ends of the chutes 37 and 39. The upper ends of the plates may be adjusted toward and from the projector to intercept the stream of flying pieces at the desired points.

The pieces of material which pass into the space between the plates or partitions K, K′ will, as previously stated, generally be of mixed quality, and they will land on an inclined plate 38 and be directed thereby into a receiving pocket M. When anthracite coal is being separated this mixture will be mostly small pieces of good coal, pieces of bone worth saving, and large worthless pieces of bony slate, or slate that has a thin covering of coal. All these pieces slide nearly alike on H and I, and require greater spacing apart and longer slides to separate them. If reseparated by similar but longer slides than H and I, then the pieces of coal would have to be thrown so far from a projector like J that much loss would be caused by their breakage in striking the parting edges and parting plates like K. I therefore feed and reseparate this part of the material by first chuting the pieces into the small pocket M. In the bottom of this pocket there is a series of reciprocating rods N. The upper ends of these rods are flush with or a little below the bottom of the pocket M when they are in their lowest position, and they are of such a size and shape that only one piece of the material will stay on the end of each one when the rod comes up. When the rods are in their highest positions their upper ends are flush with or a little above the upper end of a slide 60. The tops of the rods N slant substantially the same as the slide 60, so that the material will slide off the tops of the rods onto said slide as soon as the tops have risen high enough. These rods N are spaced apart to correspond with the subsequent parts of the machine, and they are operated by eccentrics 49 upon a shaft 49ª having a driving pulley 48 thereon. Each piece of material will acquire a certain velocity in moving down the slide 60, and those pieces which roll and bound will be prevented from bounding up high by the shield or dash board 45. At the lower end 40 of the slide 60, and in line with each feed rod N, I place another declivous surface, P, P′, etc., slanting to one side, or obliquely to the slide 60, as shown in Fig. 2. Adjacent to the lower ends of P, P′, etc., I place curved inverters Q, Q′, etc., designed to turn the pieces of material down, around and over, and thus deliver them onto the reverse slides R, R′, etc., respectively, inverted and without having their individual speeds altered materially. At the lower ends of the slides R, R′, etc., I place parters or partitions S, S′, etc., which are made adjustable and designed to separate the stream of pieces into small streams of which each one will contain similar pieces.

I prefer to divide the slide 60 into concave channels or chutes O, O′, etc., as shown in Figs. 2 and 8, so as to make it more certain that the pieces of material from each feed rod N will remain in line with the feed rod and properly enter upon the respective oblique surface P, P′, etc. The slides P, P′, R, R′, etc., have sufficiently wide and unobstructed surfaces to permit the material delivered in a transverse direction thereon, to separate laterally according to their initial velocities and individual properties. In sliding down in the channels O, O′, etc., each piece will acquire a peculiar momentum and velocity of its own in the direction of the respective channels O, O′, etc., down which it slid. On reaching the surface P each piece is deflected sidewise without losing much of its peculiar momentum, and as two forces are then acting upon the pieces in different directions the pieces will travel in curves on the surface P, because the said momentum is diminished by friction while gravitation increases the speed of the pieces in the direction of the slant of the surface P. These curves are approximately parabolas and the lengths of their bases will depend upon the amount of momentum or speed acquired by the pieces of material in the channels O, O′, etc., and somewhat on the friction on the surface P. Thus each piece will reach the inverters Q at a distance from the edge 41 in proportion to its specific gravity and the frictional nature of its surface. The best pieces of coal will slide the farthest from the edge 41 and the poorest pieces of bone and pieces of slate will slide down near the edge 41. As the friction of the pieces on the surfaces R, R′, etc., still further differentiates them, their separation will be very distinct and perfect when they finally reach the parters S, S′, etc. This wide and distinct separation obviates the necessity for altering the setting of the separator when the weather changes, or when the material is only as variable as from different veins in neighboring mines.

I prefer to make the surfaces of H and I of corrugated material, as shown in Figs. 2 and 7, because then small particles and dust will not interfere with the friction of the surfaces of the pieces of material on the surface of the slide by acting as rollers under the pieces of material. The small particles and dust will run down in the hollows 43 of the corrugations, and the regular sized pieces will slide on the ridges 44, as is illustrated in Fig. 7. These longitudinal corrugations also cause the pieces to slide straight down, which makes side collisions less likely. Similarly I prefer to make the channels O, O', etc., of the chute 60, corrugated as shown in the section, Fig. 8.

The slides P, P', etc., R, R', etc., are preferably made adjustable to vary their inclination, by suitably hinging the upper ends Z' of the former and by jointing the upper and lower slides together, or the frames which carry the slides, on a line passing through the centers of the inverters Q, Q', etc. This may be accomplished in any suitable manner.

From the foregoing description the operation of the machine will be understood without further explanation.

The various parts of my machine may be combined in different ways for different uses, and in the accompanying drawing I have illustrated a number of modifications.

In Fig. 3 I have shown an arrangement in which the slide frame 17, instead of being journaled upon the shaft of the feed roller, is supported at its upper end by a beam 51 having a curved upper edge 52 upon which the slide frame rests. The slot 20, as in Fig. 1, is concentric with the roller and when the lower end of the slide frame is adjusted the slide will swing substantially concentric with the roller. In this figure also, instead of connecting the projector frame to the slide frame 17 in a way to make the projector automatically adjustable when the slide section I is adjusted, as in Fig. 1, the projector frame $25^a$ and the slide frame 21 are adjustably connected together by a rod $27^a$ hinged to an arm $28^a$ upon the projector frame, and secured to an arm $23^a$ upon the slide frame 21 by a suitable clamp $29^a$. The arm $23^a$ is connected by an adjustable link or rod 22 to the slide frame 17. In Fig. 3 also, I have shown the projector frame $25^a$ extended to form a support for the upper ends of the separating plates or partitions K, K', this extension having slots $34^a$ therein, to receive the rods 33, $33^a$ to which the separating plates are connected. With this arrangement, when the projector is adjusted, the upper edges 30 and 31 of the separating plates remain in fixed relation to the end of the projector.

Instead of making the feed rods, which lift the material from the pocket, straight, as in Figs. 1 and 2, they may be made arcuate in form, as shown at N' Fig. 4, or $N^2$ Fig. 5. The form shown in Fig. 5 has the advantage of tending to throw the pieces of material off of the rod toward the slide.

In Fig. 6 I have shown a series of feed rods arranged in a row, in which the alternate rods $N^4$ and intermediate rods $N^3$ are reciprocated simultaneously in opposite directions, so that the pieces of material fed onto the slide H will be spaced apart from each other laterally as well as longitudinally upon the slide. In this figure the rods $N^4$ are operated by eccentrics upon a shaft $49^b$ and the rods $N^3$ by eccentrics upon a shaft $49^c$. In this figure the feed rods are arranged to feed directly onto the upper reversely arranged slides H and I, and a very perfect separation can be obtained with this arrangement. It will be noted that, with this system of feed rods, the entire surface of the slide is used for differentiating purposes, and, as one series of rods picks up material, while the other series is delivering material onto the slide, twice as many pieces can be fed onto the slide in a given time, as can be fed by a single series of rods spaced apart from one another.

Figures 9, 10, 11, 12, 13:
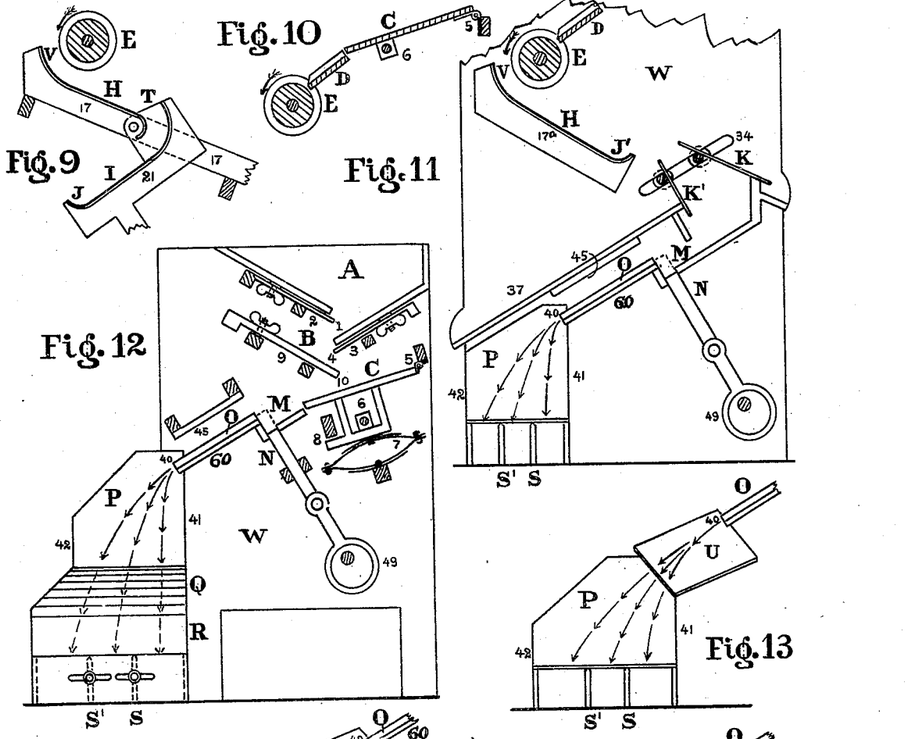
Fig. 9 is a vertical section through the feed roller and through a pair of reversely inclined slides, the upper slide being stationary and the lower slide adjustable.
Fig. 10 is a similar view through the roller, feed chute leading to the roller and a modified form of feed plate.
Fig. 11 is a vertical section through the central and lower portions of a modified form of separator, in which the reversely inclined slide and inverter for inverting the material are omitted.
Fig. 12 is a similar view through a modified form of separator, adapted particularly for separating large pieces of material, and in which the feed roller and inverter are omitted.
Figs. 13, 14 and 15 are front elevations of different forms of separating surfaces upon which the material is delivered in a direction transverse to the inclination of the surfaces.

In Fig. 9 I have shown the upper slide frame 17 stationary with respect to the roller, and the lower slide frame 21 adjustable and provided with a projector J', and in Fig. 10 I have shown the feed plate C resting directly upon the angular shaft, the spring and stop or striker being omitted. This arrangement is suitable for handling light material.

In Fig. 11 I have shown an arrangement suitable for separating material which does not contain composite pieces or pieces which vary on their opposite sides and which therefore do not require inversion. In this figure the reverse slides I and R of Fig. 1 are omitted and a projector J' is arranged at the lower end of the slide H.

In Fig. 12 I have shown an arrangement suitable for separating large, heavy pieces of material, in which the material is fed directly from the feed plate C into the hopper M, from whence it is delivered in single pieces onto the chute 60, and is then directed in a transverse direction onto the slides P and R.

Figure 14:
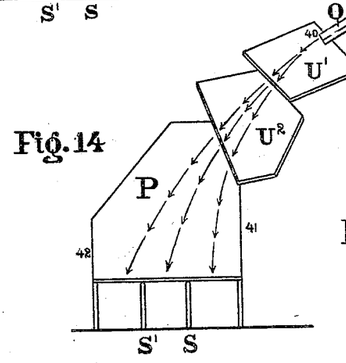
Figure 15:
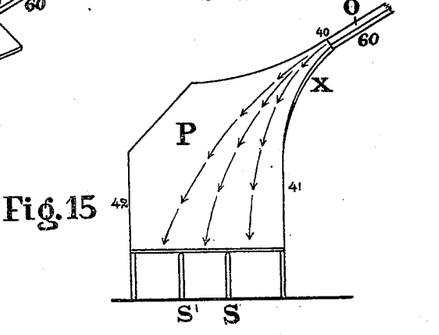

As the change in direction from the chute or slide 60 to the surface P is rather abrupt, it is desirable to insert an intermediate plate U, Fig. 13, whose lay is intermediate between the lays of said chute and surface. Or more than one intermediate plate may be inserted so as to make the change in direction very gradual, as shown in Fig. 14. In place of the steps or plates U, U', $U^2$, one twisted or bent surface X may be used, as shown in Fig. 15. These intermediate plates U, or U', $U^2$, and the twisted or bent surface X, prevent breakage of the pieces of good coal and also turn the course of all the pieces without materially interfering with the individual velocities acquired in the channels O, O', etc.

Figures 16, 17, 18, 19, 20, 21, 22:
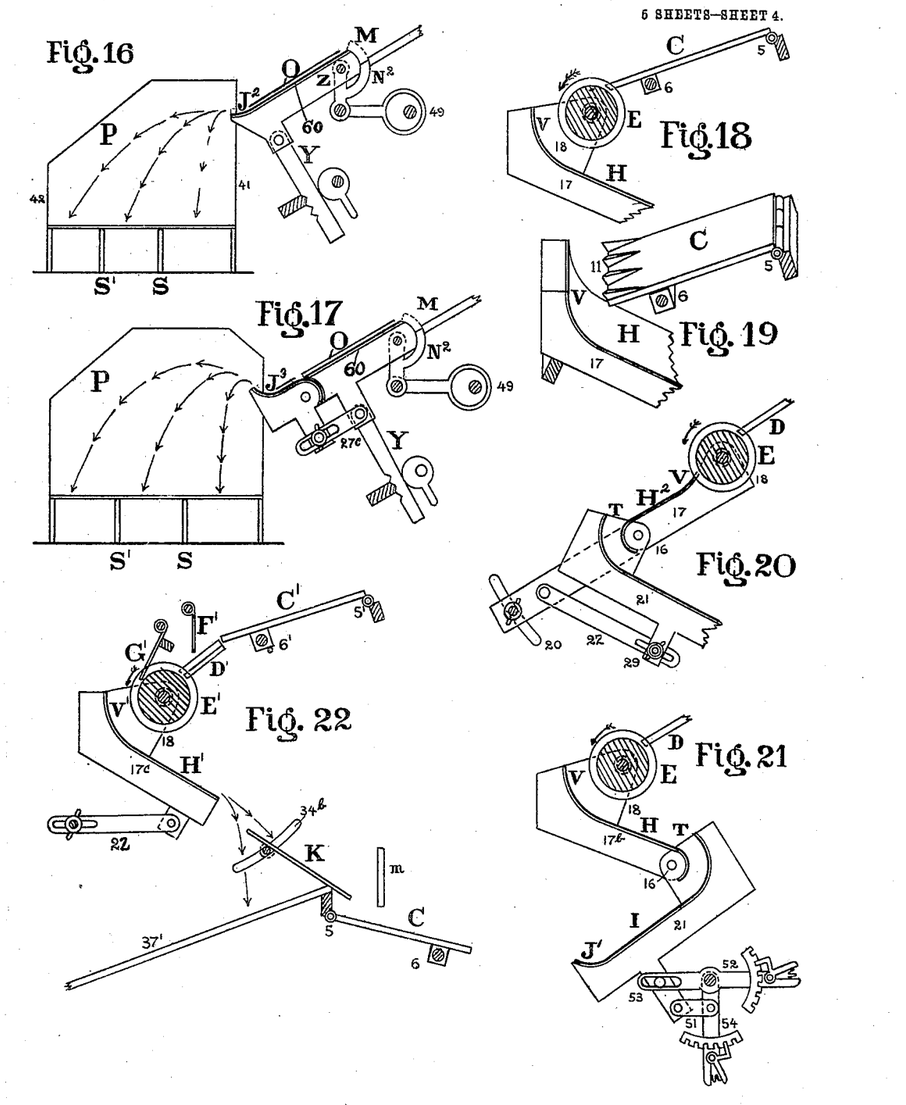
Figs. 16 and 17 are similar views of separating surfaces and vertical sections through the chutes for delivering the material on such surfaces, showing modifications of the chutes and adjacent parts.
Fig. 18 is a vertical section through the feed roller and adjacent parts, showing a modified arrangement of the feed plate.
Fig. 19 is a perspective view showing the feed plate and upper portion of the adjacent slide, the feed plate being arranged to feed directly onto the slide.
Fig. 20 is a vertical sectional view through the feed roller and a modified arrangement of the slides, in which the upper slide surface does not extend beneath the roller.
Fig. 21 is a similar view through the upper slides and roller showing a modified form of mechanism for holding and adjusting the slides.
Fig. 22 is a similar view showing a modified arrangement of parts for a primary separation.

When a very wide separation is wanted on P, or on P and R, I place a projector $J^2$ at the lower end of the slide 60, as shown in Fig. 16. It is best to let this projector end horizontally, as shown in said figure, but the projector may also be turned slightly upward, as illustrated in Fig. 17 at $J^3$. In Fig. 16 the chute 60 is shown adjustable about a shaft Z at its upper end and is supported at its lower end by one or more adjustable rods Y. In Fig. 17 the projector J³ is also shown to be adjustably connected to the frame of the slide or chute 60 by a link 27°.

When the material comes to the separator in a steady stream not exceeding the separator's capacity, then the pockets A and B may be omitted. Some of the minor parts shown may also be omitted when a very perfect separation is not desired. Thus the stream parters 11, and the chutes $d$ may be omitted, and the pieces fed directly from the plate C onto the roller E, as shown in Fig. 18. And when only a partial separation is desired the material may be fed directly from the end of the feed plate C onto the deflector V or slide H, as shown in Fig. 19.

In Fig. 20, instead of arranging the upper slide section beneath the feed roller and arranging a deflecting curved plate concentric with the roller, the slide section H² extends upwardly to the forward side of the roller. This arrangement is suitable for some purposes but in handling the finer material small pieces are apt to become jammed between the slide and the roller and the arrangement with the curved deflecting plate is preferable.

In Fig. 21 I have shown a modified arrangement of rods and parts for supporting and adjusting the reversely inclined slides H and I. In this figure the slides are supported vertically by the adjustable lever 52 having a slot 53 which is engaged by a pin upon the frame of the lower slide section and the slide is supported and adjusted laterally by means of the adjustable lever 54 and link 51, which connects said lever with the slide frame.

When such a separator is to be used for separating culm, a single piece feeder, a slide having no projector, and only one parting plate, as illustrated by C', D', H', K, Fig. 22, should be inserted before the slide H T I J shown in Fig. 1, because wood, bark, and other pieces of material that do not slide well usually clog a projector. I use only one parting plate K, for the preliminary separation of culm, as shown in Fig. 22, because the pieces of wood, etc., will drop almost perpendicularly from the end of the slide H' onto the chute 37', while the coal, bone and nearly all the slate will land on the plate K. C, Fig. 22 is the same as C, Fig. 1, and other required parts are added below C in a culm separator. $m$, Fig. 22 is a dash-board for arresting all the pieces of material coming over K and causing them to land on the upper part of the plate C.

In Fig. 25 I have shown a strick F', consisting of an apron of flexible material arranged above the chute D, and also a drag G', consisting of an apron of flexible material arranged in front of the feed roller. Such flexible fabric or material may be used instead of the metal strips shown in Figs. 1, 2 and 24, but the latter wear longer and are therefore preferable.

Figure 28:
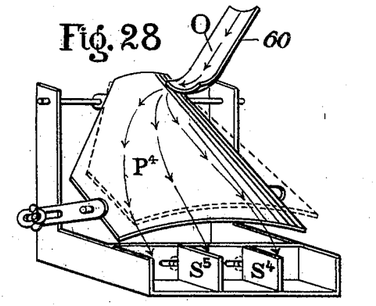
Fig. 28 is a front perspective view of a convex differentiating surface, means for adjusting the same and a feed chute arranged to deliver material thereon in a direction transverse to the inclination of the chute.
Figure 29:
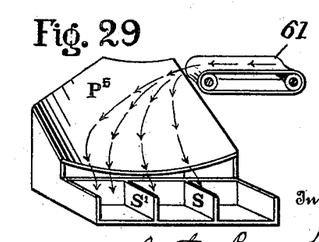
Fig. 29 is a similar view of a concave differentiating surface, showing also a traveling belt for delivering material onto said surface.

In place of the chute 60 other means may be substituted for impelling or sending the pieces of material transversely onto the upper part of the slanting surface such as the traveling belt 61, Fig. 29, the most essential feature of this part of my invention being the spreading of the stream transversely over the surface by imparting velocity to the pieces and then sending them across or obliquely over the surface. The best result is obtained by feeding the pieces of material apart from each other into the chute 60 and permitting them to each acquire an individual velocity therein by their gravity and friction, and then causing them to spread by feeding them transversely onto the sidewise slanting surface P, but this spreading will also take place to a sufficient extent for some purposes by sending the pieces over the surface P at equal, or nearly equal velocities and close behind each other, because on account of the sidewise slant of the surface P, pieces which are close behind each other will be free to slide down sidewise independent of each other. For instance if a piece of coal is immediately behind a piece of slate in the chute 60, then the piece of slate will impede and retard the piece of coal, and the piece of coal will push and accelerate the piece of slate, but after arriving on the sidewise slanting surface P these two pieces will be free to leave each other, because they will then slide to one side besides continuing to tend to slide in the general direction of the momentum acquired in the chute 60, or other means by which they may have been impelled. On account of their different frictions on the surface P they will travel in diverging lines over said surface and thus become separated according to their gravity and friction on P. A good separation is usually obtained by making the surface P a plane, but it may also be made a little convex, as shown at P⁴, Fig. 28, or concave, as shown at P⁵, Fig. 29, as may be found most desirable for the separation wanted. A properly formed convex surface will give the widest separation and will especially tend to separate the coal and bone more than a plane surface at P. A concave surface at P will tend to separate only the slate and keep the coal and bone together. A concave surface is therefore most suitable for separating small steam sizes of coal from which only the heavy slate or rock is to be separated; and a convex surface is most suitable for the largest sizes. When only a partial separation is required, or when the pieces are very large, then a small stream of pieces may be fed into each channel O, O', etc., without spacing all the pieces apart lengthwise, because upon entering on the sidewise slanting surfaces P, P', etc., the pieces will become spaced apart to such an extent that a fairly good separation will be obtained, even if the pieces follow close behind each other in the channels O, O', etc. As the pieces will nearly all acquire an equal velocity in the channels, when they are fed close behind each other, they will separate mainly by their frictions on the surfaces P, P', etc., and the surfaces P, P', etc., and R, R', etc., must therefore be made long enough to give room and time or length for a sufficient separation. By again feeding the pieces transversely onto sidewise slanting surfaces from the chutes S S', S' S², etc., an almost perfect separation might be obtained without any of the mechanical moving parts E, C, and N, N', etc.

Figure 26:
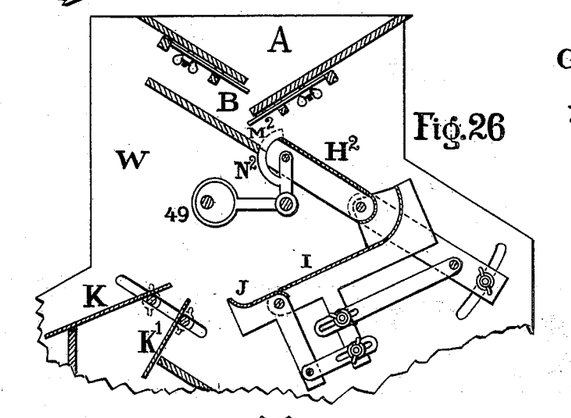
Fig. 26 is a vertical section through the upper part of a modified form of separator.

In Fig. 26 I have shown an arrangement for feeding the pieces of material separately onto the upper slide sections H² and I, in which the material from the receiving and storing pocket A and the secondary pocket B is fed directly into a pocket M², and from the latter pocket the pieces of material are lifted singly by reciprocating feed rods N² and delivered upon the upper slide section. Such an arrangement gives a very perfect separation at the separating partitions K, K'. In this figure, it will be noted, the vibrating plate, feed roller and intermediate chute D, shown in Fig. 1, are not required.

The feed roller is preferably grooved, but, as shown in Fig. 27, a plain roller E' may be employed when the channels $d$ or ribs 11, or both are used.

Having described my invention what I claim and desire to secure by Letters Patent is:

1. In a separator of the kind described, a stationary receiving pocket having downwardly inclined bottom pieces and having a restricted discharge opening between said pieces, one of said inclined bottom pieces being extended under the other, a bottom plate inclined oppositely to and extending under and adjacent to the lower end of said extended bottom piece, and forming therewith a stationary secondary pocket having a restricted outlet opening, a feed plate arranged below the outlet of said secondary pocket and inclined oppositely to said bottom plate, means for vibrating said feed plate and separating mechanism arranged to receive the material from said feed plate.

2. In a separator, the combination with a differentiating slide and one or more separating partitions at the lower end of the slide, of means for feeding the material to be separated onto the slide comprising a feed roller at the upper end of the slide, an inclined feed plate arranged to convey material to said roller the inclination of said plate being such that the material will not slide freely thereon, means for giving sudden or jarring movements to said plate, and means for delivering the material onto said plate.

3. In a separator, the combination with a differentiating slide and one or more separating partitions at the lower end of the slide, of means for feeding the material to be separated onto the slide comprising a feed roller at the upper end of the slide, an inclined feed plate arranged at such an angle that the material will not slide freely thereon, means for vibrating said plate, and a stationary slide section arranged to conduct the material from said plate to the roller.

4. In a separator, the combination with a differentiating slide and one or more separating partitions at the lower end of the slide, of means for feeding the material to be separated onto the slide comprising a feed roller at the upper end of the slide, an inclined feed plate arranged at such an angle that the material will not slide freely thereon, having a plain upper portion and ribs or stream breakers near its lower end, means for vibrating said plate, and a stationary slide section arranged to conduct the material from said plate to the roller.

5. In a separator, the combination with a differentiating slide and one or more separating partitions at the lower end of the slide, of means for feeding the material to be separated onto the slide comprising a feed roller at the upper end of the slide, an inclined feed plate arranged at such an angle that the material will not slide freely thereon, having a plain upper portion and ribs or stream breakers near its lower end, means for vibrating said plate, and a stationary slide section having channels arranged to conduct the material from said plate to the roller.

6. In a separator, the combination with a differentiating slide and one or more separating partitions at the lower end of the slide, of means for feeding the material to be separated onto said slide comprising a moderately inclined feed plate, means for vibrating said plate, a stationary slide section having channels thereon and arranged between said plate and differentiating slide, and one or more yielding aprons suspended above said channels.

7. In a separator, the combination with a differentiating slide and one or more separating partitions at the lower end of the slide, of means for feeding the material to be separated onto the slide comprising a feed roller having annular channels, means for delivering the material into the channels of said roller, and one or more drags loosely suspended above the roller and normally lying substantially tangential to the forward or downwardly turning side of the roller and in line with said channels.

8. In a separator, the combination with a differentiating slide and one or more separating partitions at the lower end of the slide, of means for feeding the material to be separated onto said slide, comprising a feed roller arranged at the upper end of the slide, one or more drags loosely suspended above the roller and normally lying substantially tangential to the forward or downwardly turning side of the roller, and means for delivering the material onto said roller.

9. The combination of fixed declivous channels, one or more yielding aprons hung over the said channels, a feed roller at the lower end of the said channels, one or more drags loosely hung over the said feed-roller for the purpose described, and means for feeding material into the said channels.

10. The combination of a slanting, vibrated feed-plate, a feed-roller, declivous channels leading from the lower end of the said feed-plate to the said feed-roller, one or more drags loosely hung over the said feed-roller for the purpose set forth, one or more yielding aprons hung over the said channels, and means for feeding a limited quantity of material onto the said feed-plate.

11. The combination of a slanting, vibrated feed plate, a feed-roller, streambreakers on the lower part of the said feed-plate arranged for the purpose set forth, declivous channels leading from between the said stream breakers to the said feed-roller, one or more yielding aprons hung over the said channels, one or more drags loosely hung over the said feed-roller for the purpose described, and means for feeding a limited quantity of material onto the said feed-plate.

12. In a separator of the kind described, a feed roller with one or more annular channels, in combination with means for feeding pieces of material into the said channel or channels, and one or more drags loosely hung over the roller in each channel for the purpose set forth.

13. In a gravity separator, feeding means comprising a feed roller, means for delivering material to said roller, one or more drags loosely suspended above the roller and normally lying substantially tangential to the forward or downwardly turning side of the roller, and a stop arranged to hold said drags out of contact with the roller.

14. In a gravity separator, the combination of a declivous slide, one or more separating partitions at the lower end of said slide, a feed roller at the upper end of said slide, means for adjustably supporting said slide, said means being arranged to permit the slide to move substantially concentric with the feed roller, and means for securing the slide in any position of adjustment.

15. In a gravity separator, a feed roller, a declivous slide comprising an upper section arranged to swing about the axis of the roller and a lower section pivotally connected to the upper section and inclined oppositely thereto, and means for holding said sections in different positions of adjustment relatively to one another and to the roller.

16. In a separator of the kind described, a declivous frictional differentiating slide in two sections oppositely inclined and adjustably jointed together, an inverting deflector at the upper end of the said lower section gradually turning from the lay of the said upper end toward the lay of the lower end of the upper section of slide, said deflector being formed substantially concentric with the center line of the joint between the said upper and lower sections of slide, and adjustable means for holding the said two sections at any suitable angle to each other.

17. In a gravity separator, a pivotally mounted slide-supporting frame and a slide comprising an upper section secured in fixed relation to said frame and a lower section inclined oppositely to the upper section and adjustably secured to said frame said lower section having an inverting deflector at its upper end curving gradually around the lower end of the upper section.

18. In a gravity separator, a pivotally mounted slide-supporting frame, a slide comprising an upper section secured in fixed relation to said frame and a lower section inclined oppositely to the upper section and adjustably secured to said frame said lower section having an inverting deflector at its upper end curving gradually around the lower end of the upper section, and a projector hinged to the lower section and adjustably connected with the frame.

19. In a gravity separator, a feed roller, a slide-supporting frame adjustable about the axis of said roller, and a slide comprising an upper section secured in fixed relation to said frame and a lower section inclined oppositely to the upper section and adjustably secured to said frame said lower section having an inverting deflector at its upper end curving gradually around the lower end of the upper section.

20. In a gravity separator, a feed roller, a slide-supporting frame adjustable about the axis of said roller, a slide comprising an upper section secured in fixed relation to said frame and a lower section inclined oppositely to the upper section and adjustably secured to said frame said lower section having an inverting deflector at its upper end curving gradually around the lower end of the upper section, and a projector hinged to said lower section and adjustably connected with the frame.

21. In a separator of the kind described, the combination of a declivous frictional differentiating slide in two oppositely inclined sections, the frame of the lower section being adjustably jointed to the frame of the upper section near the lower end of the upper section, adjustable means for holding the lower section in a suitable position, a projector adjustably jointed to the lower end of the lower section of the said slide, one or more connecting rods jointed to a part of the frame of the said projector at one end, and jointed to a part of the frame of the said upper section of slide at the other end, said jointed connection being so placed and proportioned as to automatically set the projector in a suitable position whenever the lower section of the said slide is being adjusted.

22. In a gravity separator, a declivous slide, an adjustable projector frame at the lower end of said slide, a projector carried by said frame, and one or more separating plates or partitions having their upper ends carried by said projector frame and their lower portions resting upon fixed supports.

23. In a separator for lump material, a differentiating slide, a pocket arranged transversely of the slide at its upper end and adapted to contain a quantity of the material to be separated, means for feeding the material into said pocket, a plurality of rods or fingers spaced apart from one another and movable from the bottom of said pocket to the upper edge of the slide, each rod having its upper end suitably formed to carry only a small proportion of the material within the pocket from the pocket to the slide during each upward movement of the rod, and means for reciprocating said rods.

24. In a gravity separator, a pocket adapted to receive a quantity of mixed lump material, a series of reciprocating rods or fingers arranged to lift pieces of material from said pocket to the surface of the slide, and means for reciprocating the alternate and intermediate rods in the series in opposite directions simultaneously.

25. In a separator for lump material, a stationary slide, having a differentiating surface which is substantially a plane surface, and arranged at such an angle that the pieces of material will move by gravity thereon, and means for imparting velocity to the material to be separated and for directing it onto the upper portion of the slide in a direction transverse to the general lay or slope of the slide and substantially parallel with the surface thereof, whereby the lateral movement of the pieces will be gradually diminished or arrested by the friction of the pieces on the slide, and the pieces will gravitate in lines diverging laterally on the slide substantially according to their initial velocities and their frictional retardation upon the slide.

26. In a separator for lump material, a stationary slide, having a differentiating area approximating a plane surface, arranged at such an angle that the pieces of material will move by gravity thereover, and means for imparting velocity to the material to be separated and for delivering the pieces of material spaced individually apart from one another on to said slide in a direction which will cause the pieces of material to move across the surface of the slide to various horizontal distances from the point of delivery, said slide being so formed and arranged that the transverse movement of the pieces will be gradually diminished or arrested by the friction of the pieces upon the slide and the pieces will gravitate in lines diverging laterally on the slide substantially according to their initial velocities and their frictional retardation upon the slide.

27. In a separator for lump material, a stationary slide, having a differentiating area approximating a plane surface, arranged at such an angle that the pieces of material will move by gravity thereover, means for imparting velocity to the material to be separated and for delivering the pieces of material spaced individually apart from one another on to said slide in a direction which will cause the pieces of material to move across the surface of the slide to various horizontal distances from the point of delivery, said slide being so formed and arranged that the transverse movement of the pieces will be gradually diminished or arrested by the friction of the pieces upon the slide and the pieces will gravitate in lines diverging laterally on the slide substantially according to their initial velocities and their frictional retardation upon the slide, and one or more separating partitions arranged to divide the material moving downward over the slide.

28. In a separator for lump material, a stationary slide arranged at such an angle that the pieces of material will move by gravity thereover, and means for imparting individual velocities to the pieces of material according to their properties and for delivering the pieces spaced individually apart from one another on to said slide in a direction transverse to the general slope or inclination of the slide, said slide being so formed and arranged that the transverse movement of the pieces will be gradually diminished or arrested by the friction of the pieces upon the slide and the pieces will gravitate in lines diverging laterally on the slide substantially according to their initial velocities and their frictional retardation upon the slide.

29. In a separator for lump material, a stationary slide arranged at such an angle that the pieces of material will move by gravity thereover, means for imparting individual velocities to the pieces of material according to their properties and for delivering the pieces spaced individually apart from one another on to said slide in a direction transverse to the general slope or inclination of the slide, said slide being so formed and arranged that the transverse movement of the pieces will be gradually diminished or arrested by the friction of the pieces upon the slide and the pieces will gravitate in lines diverging laterally on the slide substantially according to their initial velocities and their frictional retardation upon the slide, and one or more separating partitions arranged to divide the material moving downward over the slide.

30. In a separator for lump material, a stationary slide arranged at such an angle that the pieces of material will move by gravity thereover, and a differentiating chute arranged to deliver the material to be separated onto the upper portion of said slide in a direction transverse to the general slope or inclination of said slide, said slide being so formed and arranged that the transverse movement of the pieces will be gradually diminished or arrested by the friction of the pieces upon the slide and the pieces will gravitate in lines diverging laterally on the slide substantially according to the velocities with which they are delivered on the slide and their frictional retardation thereon.

31. In a separator for lump material, a stationary slide arranged at such an angle that the pieces of material will move by gravity thereover, a differentiating chute arranged to deliver the material to be separated on to the upper portion of said slide in a direction transverse to the general slope or inclination of said slide, said slide being so formed and arranged that the transverse movement of the pieces will be gradually diminished or arrested by the friction of the pieces upon the slide and the pieces will gravitate in lines diverging laterally on the slide substantially according to the velocities with which they are delivered on the slide and their frictional retardation thereon, and means for delivering the pieces of material spaced individually apart from one another on to said chute.

32. In a separator for lump material, a stationary slide arranged at such an angle that the pieces of material will move by gravity thereover, and a differentiating chute having a longitudinally corrugated surface, the ridges of said surface being convexly curved and in such proximity that the pieces of material will slide on two or more of them, said chute being arranged to deliver the material to be separated on to the upper portion of said slide in a direction transverse to the general slope or inclination of said slide, and said slide being so formed and arranged that the transverse movement of the pieces will be gradually diminished or arrested by the friction of the pieces upon the slide and the pieces will gravitate in lines diverging laterally on the slide substantially according to the velocities with which they are delivered on the slide and their frictional retardation thereon.

33. In a separator for lump material, a stationary slide arranged at such an angle that the pieces of material will move by gravity thereover, and a differentiating chute having a projector at its lower end arranged to deliver the material to be separated on to the upper portion of said slide in a direction transverse to the general slope or inclination of said slide, said slide being so formed and arranged that the transverse movement of the pieces will be gradually diminished or arrested by the friction of the pieces upon the slide and the pieces will gravitate in lines diverging laterally on the slide substantially according to the velocities with which they are delivered on the slide and their frictional retardation thereon.

34. In a separator for lump material, a stationary slide arranged at such an angle that the pieces of material will move by gravity thereover, and a differentiating chute having an adjustable projector at its lower end arranged to deliver the material to be separated on to the upper portion of said slide in a direction transverse to the general slope or inclination of said slide, said slide being so formed and arranged that the transverse movement of the pieces will be gradually diminished or arrested by the friction of the pieces upon the slide and the pieces will gravitate in lines diverging laterally on the slide substantially according to the velocities with which they are delivered on the slide and their frictional retardation thereon.

35. In a separator for lump material, a stationary slide arranged at such an angle that the pieces of material will move by gravity thereover, and a vertically adjustable differentiating chute arranged to deliver the material to be separated on to the upper portion of said slide in a direction transverse to the general slope or inclination of said slide, said slide being so formed and arranged that the transverse movement of the pieces will be gradually diminished or arrested by the friction of the pieces upon the slide and the pieces will gravitate in lines diverging laterally on the slide substantially according to the velocities with which they are delivered on the slide and their frictional retardation thereon.

36. In a separator of the kind described, the combination of a declivous frictional differentiating chute, a surface at the lower end of the said chute slanting sidewise to the chute and arranged for the purpose set forth, and one or more surfaces leading from the lower end of the said chute onto the upper part of the said slanting surface the lay or lays of these intermediate surfaces being intermediate between the lay of the bottom of the said chute and the lay of the top of the said slanting surface.

37. In a separator of the kind described, the combination of a declivous frictional differentiating chute, a surface slanting sidewise to the chute and arranged for the purpose set forth, and a twisted surface leading from the lower end of the chute onto the upper part of the said slanting surface.

38. In a separator for lump material a series of slides inclined at such an angle that the pieces of material will move by gravity thereover and a differentiating chute arranged to deliver the material to be separated onto the upper portions of said slides in a direction transverse to the general slope or inclination of the slides, said slides being so formed and arranged that the transverse movement of the pieces will be gradually diminished or arrested by the friction of the pieces upon the slides and the pieces will gravitate in lines diverging laterally on the slides substantially according to the velocities with which they are delivered onto the slides and their frictional retardation thereon.

39. In a separator for lump material a series of slides inclined at such an angle that the pieces of material will move by gravity thereover, a differentiating chute arranged to deliver the material to be separated onto the upper portions of said slides in a direction transverse to the general slope or inclination of the slides, said slides being so formed and arranged that the transverse movement of the pieces will be gradually diminished or arrested by the friction of the pieces upon the slides and the pieces will gravitate in lines diverging laterally on the slides substantially according to the velocities with which they are delivered onto the slides and their frictional retardation thereon, and separating partitions arranged to divide the material passing from the slides.

40. In a separator for lump material, the combination of a chute, a series of slides arranged at the lower end of the chute and slanting sidewise to the lay of said chute, and a second series of slides succeeding said first mentioned series and sloping in an opposite direction thereto, and means for inverting the material while passing from the first mentioned series of slides to the second series.

41. In a separator for lump material, the combination of a chute, a series of slides arranged at the lower end of the chute and slanting sidewise to the lay of said chute, and a second series of slides succeeding said first mentioned series and sloping in an opposite direction thereto, means for inverting the material while passing from the first mentioned series of slides to the second series, and separating partitions adjacent to the second series of slides.

42. In a separator for lump material a series of slides inclined at such an angle that the pieces of material will move by gravity thereover, a differentiating chute having a series of longitudinal channels, one channel for each slide, arranged to deliver the material to be separated onto the upper portions of said slides in a direction transverse to the general slope or inclination of the slides, said slides being so formed and arranged that the transverse movement of the pieces will be gradually diminished or arrested by the friction of the pieces upon the slides and the pieces will gravitate in lines diverging laterally on the slides substantially according to the velocities with which they are delivered onto the slides and their frictional retardation thereon, and separating partitions arranged to divide the material passing from the slides.

43. In a separator for lump material a series of slides inclined at such an angle that the pieces of material will move by gravity thereover, a differentiating chute having a series of longitudinal channels, one channel for each slide, arranged to deliver the material to be separated onto the upper portions of said slides in a direction transverse to the general slope or inclination of the slides, said slides being so formed and arranged that the transverse movement of the pieces will be gradually diminished or arrested by the friction of the pieces upon the slides and the pieces will gravitate in lines diverging laterally on the slides substantially according to the velocities with which they are delivered onto the slides and their frictional retardation thereon.

44. In a separator for lump material, the combination with a chute having a series of longitudinal channels, of a series of slides, one for each channel, said slides being arranged at the lower end of the chute and sloping sidewise to the lay of said chute, a second series of slides succeeding said first series and sloping in an opposite direction thereto, and means for inverting the material while passing from the first mentioned series of slides to the second series.

45. In a separator for lump material, the combination with a chute having a series of longitudinal channels, of a series of slides, one for each channel, said slides being arranged at the lower end of the chute and sloping sidewise to the lay of said chute, a second series of slides succeeding said first series and sloping in an opposite direction thereto, means for inverting the material while passing from the first mentioned series of slides to the second series, and separating partitions adjacent to the second series of slides.

46. In a separator of the kind described, the combination of a pair of declivous surfaces successively slanting in opposite directions to each other, means for inverting the pieces of material at the lower end of the upper one of the said pair of surfaces, and means for imparting velocity to the pieces of material and sending them sidewise onto the upper part of the upper one of the said slanting surfaces.

47. In a separator of the kind described, the combination of a pair of declivous surfaces successively slanting in opposite directions to each other and arranged for the purpose set forth, means for inverting the pieces of material at the lower end of the upper one of the said pair of surfaces, means for imparting velocity to the pieces of material and sending them sidewise onto the upper part of the upper one of the said slanting surfaces, and means for dividing the stream of pieces of material at the end of the last one of the said surfaces.

48. In a separator of the kind described, the combination of a declivous chute, a pair of surfaces at the lower end of the chute slanting sidewise to the chute in opposite directions to each other and arranged for the purpose set forth, and a section at the upper end of the lower one of the said pair of surfaces gradually turning around from the direction of the said upper end toward the direction of the lower end of the upper one of the said pairs of surfaces.

49. In a separator of the kind described, the combination of a declivous chute, a surface at the lower end of the chute slanting sidewise to the chute and arranged for the purpose set forth, a joint between the said chute and surface, and means for holding the said surface in a suitable position.

50. In a separator of the kind described, the combination of a declivous chute, a pair of surfaces slanting sidewise to the said chute in opposite directions to each other and arranged for the purpose set forth, a section at the upper end of the lower one of the said pair of surfaces gradually turning around toward the direction of the upper one of the said surfaces, a joint between the upper end of the upper one of the said surfaces and the lower end of the said chute, a joint between the lower end of the upper surface and the upper end of the lower surface, the latter joint being substantially concentric with the turned section at the upper end of the lower one of the said slides.

51. In a separator of the kind described, the combination of a chute, means for feeding pieces of material to said chute, a frictional differentiating surface at the lower end of the said chute slanting sidewise to the said chute, means for inverting the pieces of material by turning them over and around, another frictional differentiating surface slanting so as to receive the turned pieces of material, and means for separating the pieces at the end of the said second slanting surface.

52. In a separator for lump material such as coal, slate, etc., a declivous slide having a differentiating surface composed of ridges extending in parallel vertical planes in the direction of the slide's declivity, the upper surface of said ridges being rounded or convex in cross-section and forming the support for the pieces of lump material passing thereover, and said ridges being separated by dust-conveying channels of less width than said pieces of lump material, means for feeding said lump material on to the slide, and means for separating the lump material passing from the slide.

53. A separator comprising a feed roller, one or more drags hung over the descending side of said roller and arranged for the purpose set forth, a slide including one or more declivous sections having frictional differentiating surfaces, said slide being arranged to receive the pieces of material from the feed roller on its upper end, and one or more separating plates arranged adjacent to the lower end of the slide.

54. In a separator for lump material, the combination of a slide including one or more sections having declivous frictional differentiating surfaces, means for intermittently feeding the pieces of material onto the slide in single piece transverse rows in which the pieces are spaced apart from each other, and one or more separating partitions arranged adjacent to the lower end of the slide.

In testimony whereof I affix my signature, in presence of two witnesses.

ARTHUR LANGERFELD.

Witnesses:
H. H. BRADY, Jr.,
F. C. FULLER.